United States Patent
Bellinghausen et al.

(10) Patent No.: US 10,328,344 B2
(45) Date of Patent: Jun. 25, 2019

(54) GAME CONTROLLER SYSTEMS AND METHODS

(71) Applicant: VALVE CORPORATION, Bellevue, WA (US)

(72) Inventors: Jeffrey Peter Bellinghausen, Bellevue, WA (US); Scott Dalton, Bellevue, WA (US); Claire Michelle Gottschalk, Bellevue, WA (US); Eric James Hope, Duvall, WA (US); Jeffrey Keyzer, Redmond, WA (US)

(73) Assignee: Valve Corporation, Bellevue, WA (US)

( * ) Notice: Subject to any disclaimer, the term of this patent is extended or adjusted under 35 U.S.C. 154(b) by 302 days.

(21) Appl. No.: 14/513,703

(22) Filed: Oct. 14, 2014

(65) Prior Publication Data

US 2015/0105152 A1 Apr. 16, 2015

Related U.S. Application Data

(60) Provisional application No. 61/889,663, filed on Oct. 11, 2013.

(51) Int. Cl.
*A63F 13/214* (2014.01)
*A63F 13/285* (2014.01)
(Continued)

(52) U.S. Cl.
CPC .......... *A63F 13/285* (2014.09); *A63F 13/214* (2014.09); *A63F 13/2145* (2014.09);
(Continued)

(58) Field of Classification Search
CPC ........ G06F 3/016; A63F 13/21; A63F 13/214; A63F 13/285; A63F 2300/1037;
(Continued)

(56) References Cited

U.S. PATENT DOCUMENTS 5,396,267 A * 3/1995 Bouton ............... A63F 13/06
345/156
5,451,053 A * 9/1995 Garrido ............... A63F 13/06
463/37
(Continued)

FOREIGN PATENT DOCUMENTS

CA 2819678 A1 * 12/2014 ............ A63F 13/00

OTHER PUBLICATIONS

Scenyx Entertainment Community, et al., "Rapid Fire Mod for Wireless Xbox 360 Controller," retrieved on Apr. 22, 2016, at <<http://forums.xbox-scene.com/index.php?/topic/643928-rapid-fire-mod-for-wireless-xbox-360-controller/page-23>>, pp. 1-16.

*Primary Examiner* — Steven J Hylinski
(74) *Attorney, Agent, or Firm* — Lee & Hayes, P.C.

(57) ABSTRACT

Various game controller hardware and user interface configurations are disclosed. Some configurations may comprise two circular trackpads, driven by the player's thumbs, which may be clickable, allowing the entire surface to act as a button. Haptic feedback may be based on dual linear resonant actuators (e.g., by means of strong, weighted electro-magnets attached to each of the dual trackpads), capable of delivering a wide range of force and vibration, allowing control over frequency, amplitude, and direction of movement. The haptics-related components in certain implementations may also play audio waveforms and thereby function as speakers. In the center of the controller according to certain configurations may be another touch-enabled surface, this one backed by a display screen. In some configurations this entire screen itself may also be clickable, like a large single button. A variety of other exemplary implementations and configurations are described.

23 Claims, 12 Drawing Sheets

(51) Int. Cl.
*A63F 13/2145* (2014.01)
*A63F 13/24* (2014.01)

(52) U.S. Cl.
CPC ...... *A63F 13/24* (2014.09); *A63F 2300/1037* (2013.01); *A63F 2300/1068* (2013.01)

(58) Field of Classification Search
CPC ............. A63F 2300/1068; A63F 13/22; A63F 2300/1018; A63F 13/08; A63F 13/20; A63F 2300/10
USPC ........................................................ 463/37
See application file for complete search history.

(56) References Cited

U.S. PATENT DOCUMENTS

| | | | | |
|---|---|---|---|---|
| 5,759,100 | A * | 6/1998 | Nakanishi | A63F 13/06 273/148 B |
| 5,989,123 | A | 11/1999 | Tosaki et al. | |
| 6,053,814 | A * | 4/2000 | Pchenitchnikov | A63F 13/06 273/148 B |
| 6,071,194 | A * | 6/2000 | Sanderson | A63F 13/06 345/168 |
| 6,362,813 | B1 | 3/2002 | Worn et al. | |
| 6,394,906 | B1 | 5/2002 | Ogata | |
| 6,684,062 | B1 * | 1/2004 | Gosior | A63F 13/02 375/346 |
| 6,697,251 | B1 * | 2/2004 | Aisenberg | G06F 1/1616 248/118.1 |
| 6,727,884 | B1 * | 4/2004 | Leatham | A63F 13/06 345/156 |
| 6,760,013 | B2 | 7/2004 | Willner et al. | |
| 7,116,310 | B1 * | 10/2006 | Evans | G06F 3/0238 345/156 |
| 7,347,780 | B1 * | 3/2008 | Best | A63F 13/10 463/1 |
| 7,791,588 | B2 * | 9/2010 | Tierling | G06F 3/016 345/156 |
| 7,833,098 | B2 * | 11/2010 | Ohta | G06F 3/0488 463/30 |
| 7,859,514 | B1 | 12/2010 | Park | |
| 7,927,216 | B2 * | 4/2011 | Ikeda | A63F 13/06 463/37 |
| 7,973,769 | B2 * | 7/2011 | Olien | G06F 3/016 345/156 |
| 8,170,945 | B2 * | 5/2012 | Longman | G06F 3/0219 463/36 |
| 8,226,483 | B2 * | 7/2012 | Endo | A63F 13/10 463/37 |
| 8,556,721 | B2 * | 10/2013 | Aronzon | A63F 13/42 463/1 |
| 8,641,525 | B2 | 2/2014 | Burgess et al. | |
| 9,056,244 | B2 * | 6/2015 | Lesley | A63F 13/06 |
| 9,089,770 | B2 | 7/2015 | Burgess et al. | |
| 9,289,688 | B2 | 3/2016 | Burgess et al. | |
| 9,352,229 | B2 | 5/2016 | Burgess et al. | |
| 9,579,567 | B2 * | 2/2017 | Garcia | A63F 13/22 |
| 9,687,730 | B2 * | 6/2017 | Mahlmeister | A63F 13/06 |
| 9,937,416 | B2 * | 4/2018 | Ayoub | A63F 13/426 |
| 9,950,256 | B2 * | 4/2018 | Lim | A63F 13/335 |
| 2001/0035854 | A1 * | 11/2001 | Rosenberg | A63F 13/06 345/156 |
| 2002/0080112 | A1 * | 6/2002 | Braun | G06F 3/016 345/156 |
| 2002/0165028 | A1 * | 11/2002 | Miyamoto | A63F 13/06 463/46 |
| 2003/0038776 | A1 * | 2/2003 | Rosenberg | A63F 13/06 345/156 |
| 2003/0067440 | A1 * | 4/2003 | Rank | A63F 13/5255 345/156 |
| 2005/0159198 | A1 * | 7/2005 | Longman | G06F 3/0481 463/9 |
| 2005/0176505 | A1 * | 8/2005 | Stanley | A63F 13/06 463/37 |
| 2005/0225530 | A1 * | 10/2005 | Evans | G06F 3/0238 345/156 |
| 2006/0111180 | A1 * | 5/2006 | Cheng | A63F 13/06 463/36 |
| 2006/0121992 | A1 * | 6/2006 | Bortnik | G07F 17/32 463/43 |
| 2006/0152495 | A1 * | 7/2006 | Gombert | G06F 3/03543 345/172 |
| 2006/0286943 | A1 * | 12/2006 | Vance | A63F 13/06 455/90.1 |
| 2007/0018950 | A1 * | 1/2007 | Ohta | G06F 3/04886 345/156 |
| 2007/0046647 | A1 * | 3/2007 | Ohta | G06F 3/0488 345/173 |
| 2007/0057922 | A1 * | 3/2007 | Schultz | G06F 3/03547 345/173 |
| 2007/0257821 | A1 * | 11/2007 | Son | G06F 3/016 341/22 |
| 2008/0114614 | A1 * | 5/2008 | Mahesh | G06F 3/04883 705/2 |
| 2008/0163051 | A1 * | 7/2008 | Olien | G06F 3/016 715/702 |
| 2009/0205878 | A1 * | 8/2009 | Taylor | G06F 3/03547 178/18.03 |
| 2009/0213081 | A1 * | 8/2009 | Case, Jr. | G06F 1/1616 345/173 |
| 2010/0041480 | A1 * | 2/2010 | Wong | A63F 13/06 463/37 |
| 2010/0069154 | A1 * | 3/2010 | Claussen | A63F 13/02 463/37 |
| 2010/0073283 | A1 | 3/2010 | Enright | |
| 2010/0333044 | A1 * | 12/2010 | Kethireddy | G06F 3/0481 715/863 |
| 2011/0093822 | A1 * | 4/2011 | Sherwani | H04L 67/38 715/863 |
| 2011/0105231 | A1 * | 5/2011 | Ambinder | A63F 13/24 463/38 |
| 2011/0136568 | A1 * | 6/2011 | Buhr | A63F 13/22 463/29 |
| 2011/0163860 | A1 * | 7/2011 | Ryu | G06F 3/016 340/407.2 |
| 2011/0210926 | A1 * | 9/2011 | Pasquero | G06F 3/016 345/173 |
| 2012/0011437 | A1 * | 1/2012 | James | G06F 1/1643 715/702 |
| 2012/0034978 | A1 * | 2/2012 | Lim | A63F 13/235 463/36 |
| 2012/0036434 | A1 * | 2/2012 | Oberstein | G06F 3/0482 715/702 |
| 2012/0220372 | A1 * | 8/2012 | Cheung | G06F 3/04886 463/37 |
| 2012/0306633 | A1 * | 12/2012 | Heron | G01D 7/007 340/407.2 |
| 2013/0012319 | A1 * | 1/2013 | Negroponte | A63F 13/2145 463/37 |
| 2013/0084980 | A1 * | 4/2013 | Hammontree | A63F 13/06 463/36 |
| 2013/0194085 | A1 * | 8/2013 | Grant | G06F 3/016 340/407.2 |
| 2014/0101343 | A1 * | 4/2014 | Townsend | G06F 13/385 710/14 |
| 2014/0139450 | A1 * | 5/2014 | Levesque | G08B 6/00 345/173 |
| 2014/0315642 | A1 * | 10/2014 | Grant | A63F 13/06 463/38 |
| 2014/0368440 | A1 * | 12/2014 | Polyakov | G06F 1/1626 345/173 |
| 2015/0238855 | A1 | 8/2015 | Uy et al. | |
| 2016/0259415 | A1 * | 9/2016 | Ullrich | G06F 3/016 |

* cited by examiner

ND METHODS

GAME CONTROLLER SYSTEMS AND METHODS

CROSS-REFERENCE TO RELATED APPLICATIONS

This application claims the benefit of U.S. Provisional Patent Application No. 61/889,663, entitled "Game Controller Systems and Methods," and filed Oct. 11, 2013. The entirety of the foregoing patent application is hereby incorporated by reference herein.

BACKGROUND OF THE DISCLOSURE

1. Field of the Disclosure

The disclosure relates generally to controllers, for example for controlling a video or computer game, and more particularly to such controllers with improved features and characteristics.

2. General Background

Game controllers for both console and computer gaming systems are well known, and are commercially available in many different shapes and sizes, and with a wide variety of features, as well as structural and functional characteristics.

It is desirable to address the current limitations in this art.

BRIEF DESCRIPTION OF THE DRAWINGS

By way of example, reference will now be made to the accompanying drawings, which are not to scale.

DETAILED DESCRIPTION

Those of ordinary skill in the art will realize that the following description of the present invention is illustrative only and not in any way limiting. Other embodiments of the invention will readily suggest themselves to such skilled persons, having the benefit of this disclosure, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Reference will now be made in detail to specific implementations of the present invention as illustrated in the accompanying drawings. The same reference numbers will be used throughout the drawings and the following description to refer to the same or like parts.

The data structures and code described in this detailed description are typically stored on a computer readable storage medium, which may be any device or medium that may store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Figure 1:
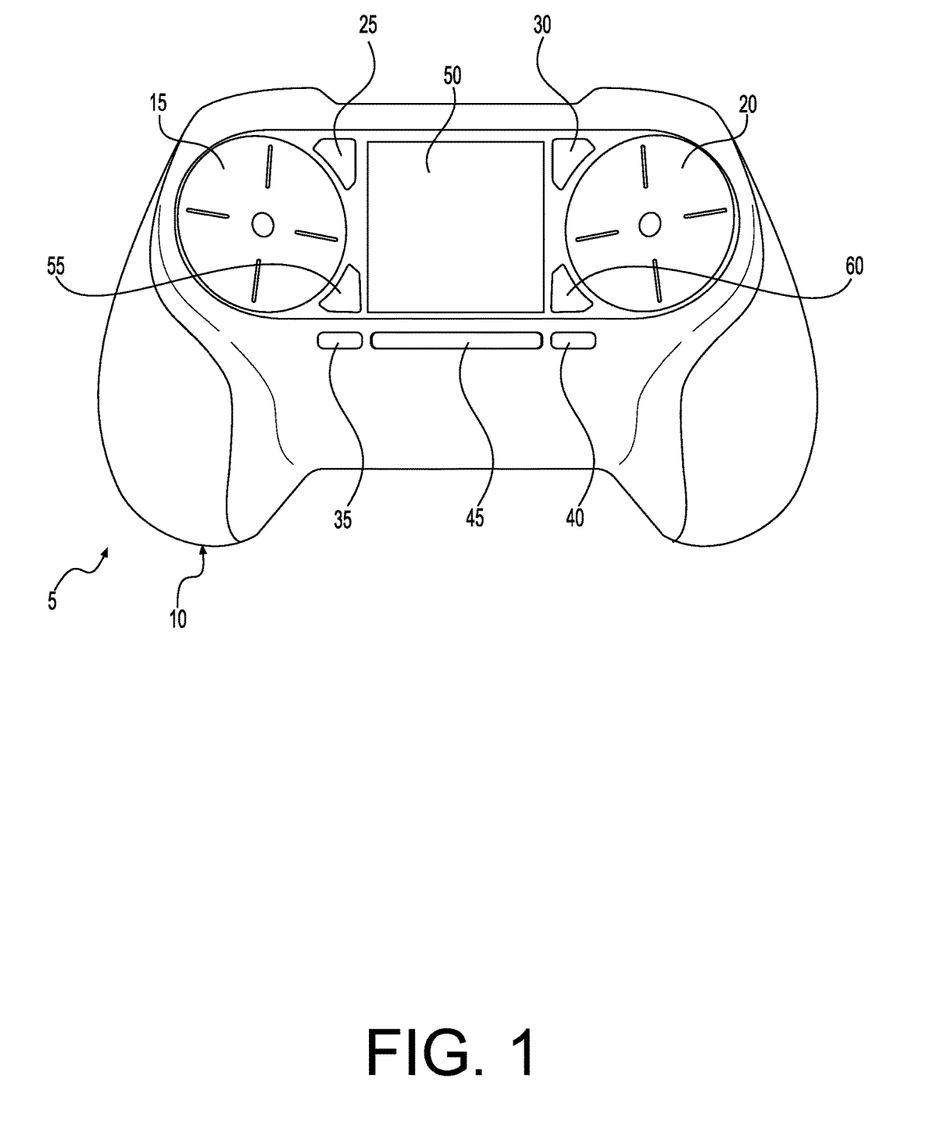
FIG. 1 depicts a front view of a game controller according to some aspects of the present invention.

FIG. 1 depicts a front view of a game controller 5 according to some aspects of the present invention. As shown in FIG. 1, game controller 5 comprises a front housing 10, typically made of plastic as is well-known in the art. Front housing 10 is ergonomically shaped so as to be comfortable held by a user's two hands, with the user's left thumb controlling left trackpad 15 and the user's right thumb controlling right trackpad 20. Multiple buttons (e.g., 25, 30, 35, 40, 45) may be located at various places on the front surface of controller 5, for example as shown in FIG. 1. These buttons may also include the trackpads 15, 20, themselves, as well as a central display screen 50 (which may also function as a button in certain embodiments, or may be implemented as one or more buttons with or without programmable display elements). The term "button" as used herein may refer to a mechanically actuated switch or other mechanical control device, but may also refer to any other control device that may be actuated by movement of one or more user fingers (e.g., a capacitively or inductively coupled touch screen or other control surface, a touch sensor, an electronic switch, or the like).

Figure 2:
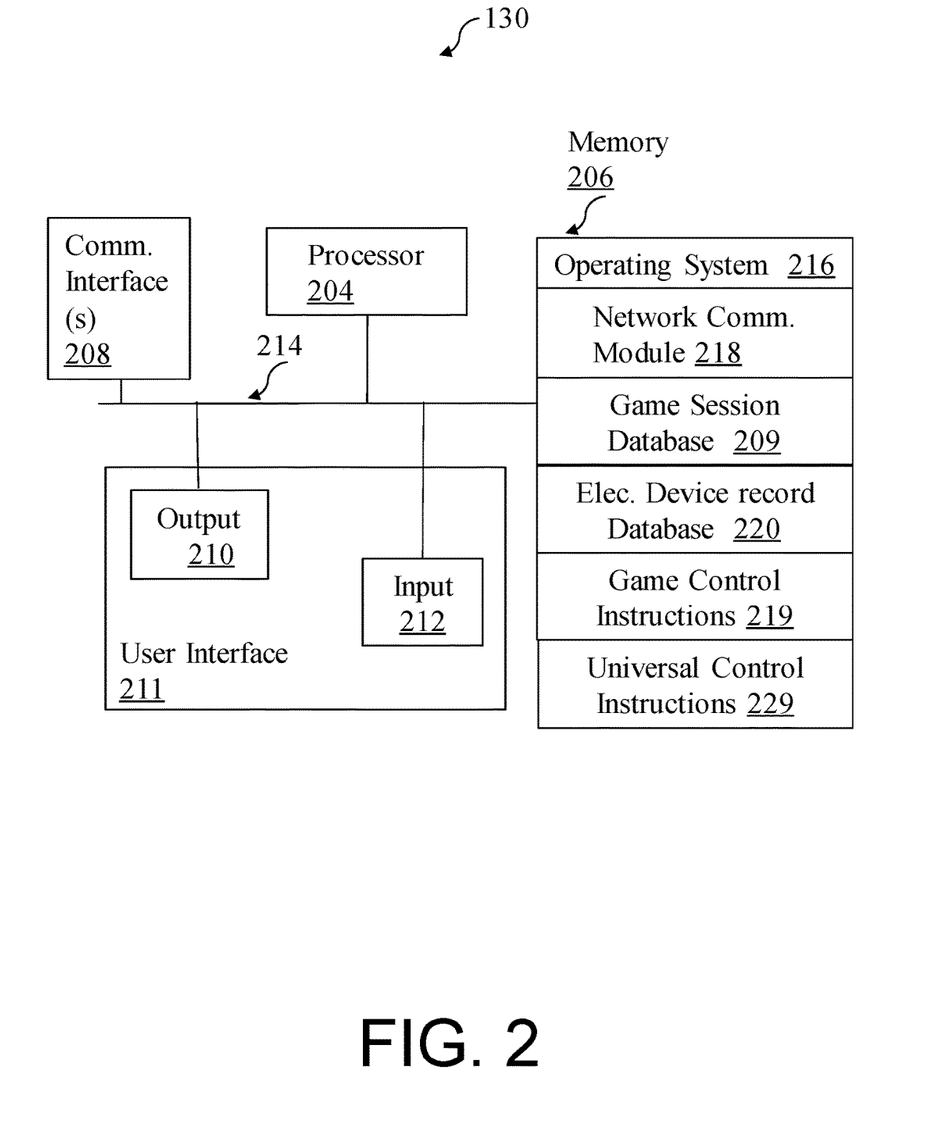
FIG. 2 is a block diagram of game controller systems according to some aspects of the present invention.

FIG. 2 is a block diagram of game controller systems according to some aspects of the present invention.

FIG. 2 illustrates certain embodiments of a game controller 130 according to an embodiment of the invention. Game controller 130 may include one or more processors 204, memory 206, communication interface(s) 208, user interface 211 including output module 210 and input module 212, and one or more communication buses 214 for interconnecting these components. The communication bus 214 may include circuitry that interconnects and controls communications between system components.

In certain embodiments, processor 204 may provide computer processing for controller 130. Processor 204 may include without limitation any type of processor, including, but not limited to, a microprocessor, a microcontroller, a digital signal processor, a personal organizer, a device controller, and a computational engine within an appliance.

In certain embodiments, memory 206 may include without limitation high-speed random access memory, such as DRAM, SRAM, DDR RAM or other random access solid state memory devices; and may include without limitation non-volatile memory, such as one or more magnetic disk storage devices, optical disk storage devices, flash memory devices, or other non-volatile solid state storage devices. Memory 206, or one or more of the storage devices (e.g., one or more non-volatile storage devices) in memory 206, may include a computer readable storage medium. In addition, according to certain embodiments, memory 206 may be supplemented using portable memory storage devices 105, such as memory cards, USB sticks, etc., that may be coupled to controller 130 via one or more interfaces 107, such as a USB interface.

In certain embodiments, memory 206 or the computer readable storage medium of memory 206 may store one or more of the following programs, modules and data structures to be executed by processor 204: an operating system 216 that includes procedures for handling various basic system services and for performing hardware dependent tasks; a network communication module 218 that is used for game controller 130 to other devices (such as, personal computing devices 120) via the one or more communication interfaces 208; a database 209 for storing game session records; a database 220 for storing records associated with one or more electronic devices which are controlled using game controller 130; instructions 219 for functioning as a non-console video game controller and instructions 229 for functioning as a controller for one or more electronic devices. In certain embodiments, database 209 and/or database 220 may be saved in non-volatile memory in memory 206. Alternatively or in addition, database 209 and/or database 220 may be stored on portable memory storage device 205, such as memory card, USB stick, etc., coupled to game controller 130 via one or more interfaces 107, such as a USB interface.

Communication interface 208 enables wireless communications with one or more electronic devices and one or more personal computing devices 120 using any type of wireless communication channel capable of coupling together enabled devices. This wireless communication channel may include without limitation an infrared communication link or an RF link such as a Bluetooth link. With respect to communicating with one or more of the personal computing devices 120, in certain embodiments, additionally or in the alternative, communication interface 208 may provide support for a wired connection between the personal computing devices 120 and controller 130. For example and without limitation, communication module 208 may support a USB interface 107 for insertion of a USB cable for coupling game controller 130 and a user's computer on which the user wishes to play a video game.

In certain embodiments, output module 210 renders information to a user of game controller 130. The information may be displayed on an appropriate display device such as for example and without limitation a liquid crystal display (LCD) of a touch screen. Output module 210 may allow the user to view more soft controls and more display windows for monitoring/controlling various devices. Input module 212 may accept inputs from a user of game controller 130 through the use of hard keys (e.g., buttons, arrows, etc.) and/or soft keys (e.g., as implemented using a touch screen). User inputs obtained via input module 212 may be supplied to processor 204 for processing.

In certain embodiments, these (and other components that are not shown, such as battery or other power source, etc.) enable game controller 130 to provide control functionality to control one or more electronic devices, such as without limitation TV, stereo, DVD, auxiliary, etc. As an example and without limitation, when providing remote control functionality to control a television, game controller 130 may provide volume controls to turn the volume up or down on a television, channel controls to turn the channel up or down on the TV, an input selection that may allow the choice of which input to display video and sound from including, video 1, video 2, HDMI and VGA, etc. Input module 212 may allow for various functions including turning directly to a channel on the TV. A power selection module (not shown) may enable the user to turn TV on and off. Further, in certain embodiments, controller 130 may enable control and/or monitoring of various household devices including, light switches, heaters, air conditioners and appliances. Further, controller 130 may be used as a game controller when playing video games at one or more personal computing devices 120.

Figure 3:
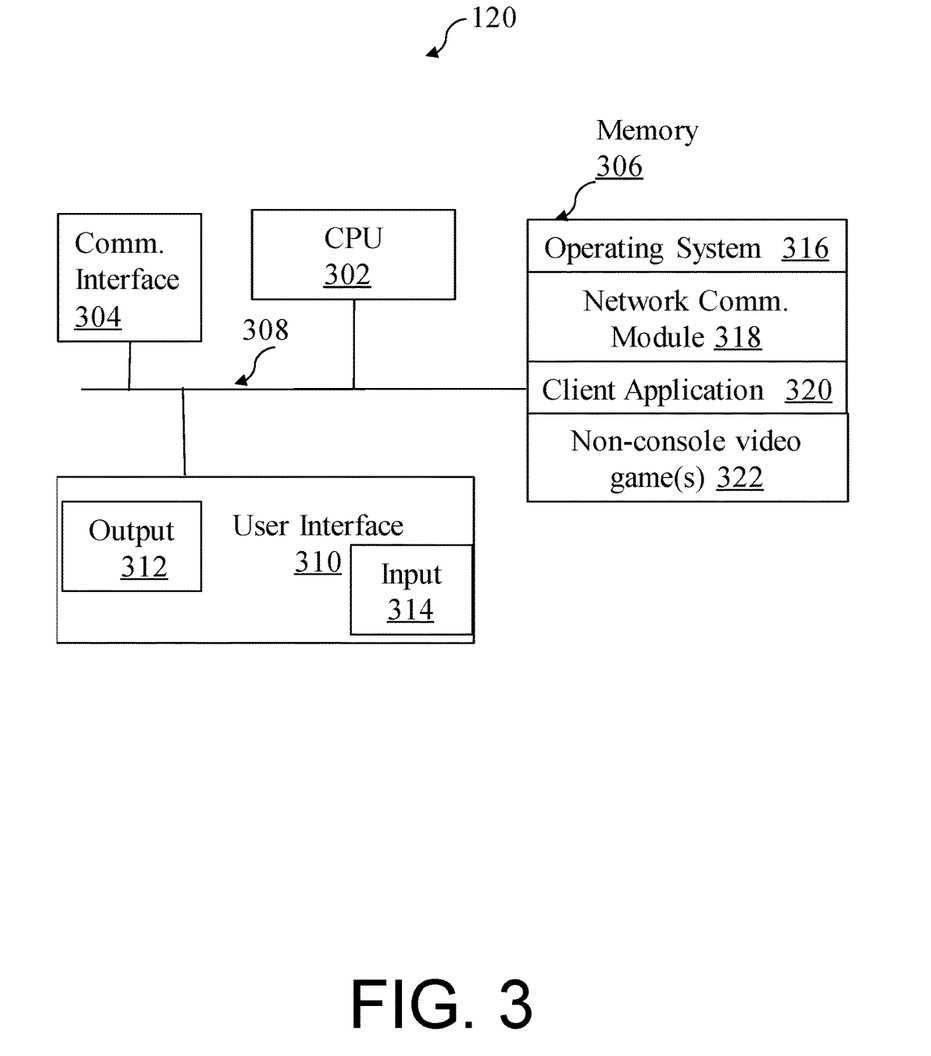
FIG. 3 is a block diagram of game controller systems according to some aspects of the present invention.

FIG. 3 is a block diagram of game controller systems according to some aspects of the present invention.

In certain embodiments, FIG. 3 is a block diagram of an exemplary personal computing device 120 in accordance with certain embodiments of the present invention. The personal computing device 120 typically includes one or more processing units (CPUs) 302, one or more network or other communications interfaces 304, memory 306, and one or more communication buses 308 for interconnecting these components. The communication buses 308 may include without limitation circuitry (sometimes called a chipset) that interconnects and controls communications between system components. Personal computing device 120 may include a user interface 310 comprising an output (e.g. display) device 312 and an input device (e.g., keyboard) 314.

In certain embodiments, memory 306 may include without limitation high-speed random access memory, such as DRAM, SRAM, DDR RAM or other random access solid state memory devices; and may include without limitation non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or one or more of the storage devices (e.g., one or more non-volatile storage devices) in memory 306, may include a computer readable storage medium. In certain embodiments, memory 306 or the computer readable storage medium of memory 306 may store one or more of the following programs, modules and data structures: an operating system 316 that includes procedures for handling various basic system services and for performing hardware dependent tasks; a network communication module 318 that is used for connecting personal computing device 120 to other computers via the one or more communication network interfaces 304 and one or more communication networks, such as the Internet, other wide area networks, local area networks, metropolitan area networks, and so on; a client application 320 that may permit a user to interact with the personal computing device 120 and/or non-console video game 322; and a non-console video game 322 (or data associated therewith) that may be rendered by the client application 312. In certain embodiments, the video games 322 may be stored (in whole or in part) on a server (e.g., a game server) to which personal computing device 120 may be communicating using communication interface 304 and one or more communication networks, and rendered on the personal computing device 120.

Figure 4:
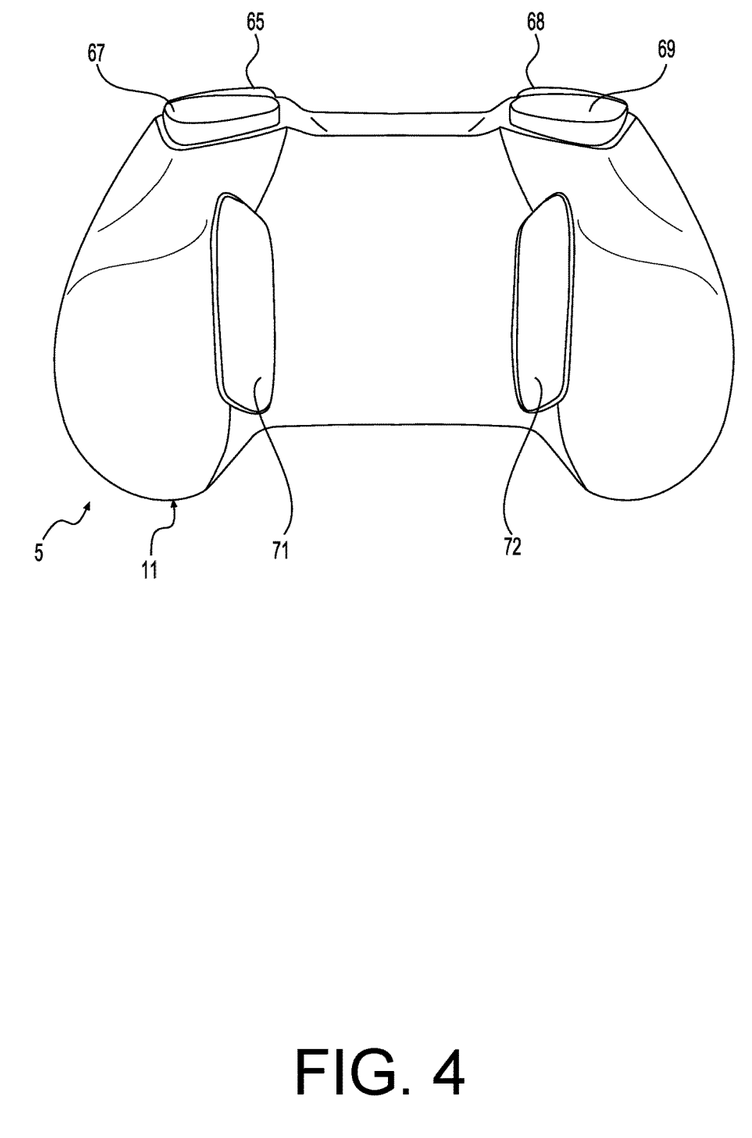
FIG. 4 depicts a rear view of a game controller according to some aspects of the present invention.

FIG. 4 depicts a rear view of a game controller 5 according to some aspects of the present invention. One or more buttons (e.g., 65, 67, 68, 69) may be located along the top surface of controller 5, and may be activated by the user's fingers, typically the user's index and/or middle fingers. One or more buttons (e.g., 71, 72) may be located along the back surface of controller 5, and may be activated by the same or other user fingers. The rear housing 11 of controller 5 is typically made of plastic as is well-known in the art, and may be ergonomically shaped, for example as shown in FIG. 4, for a comfortable grip.

Figure 5:
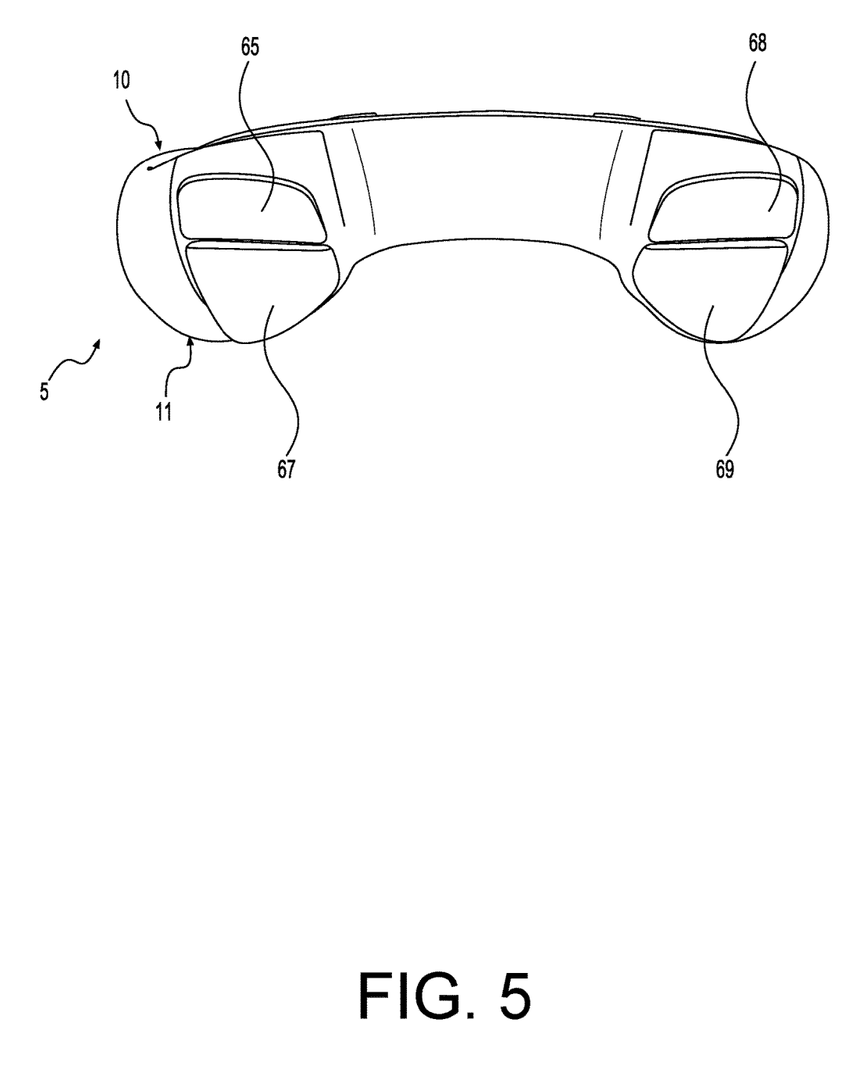
FIG. 5 depicts a bottom view of a game controller according to some aspects of the present invention.

FIG. 5 depicts a top view of a game controller 5 according to some aspects of the present invention, showing certain control buttons (65, 67, 68, 69) from the top. Some of these buttons (e.g., 65, 68) are sometimes referred to as "triggers" in the art.

Figure 6:
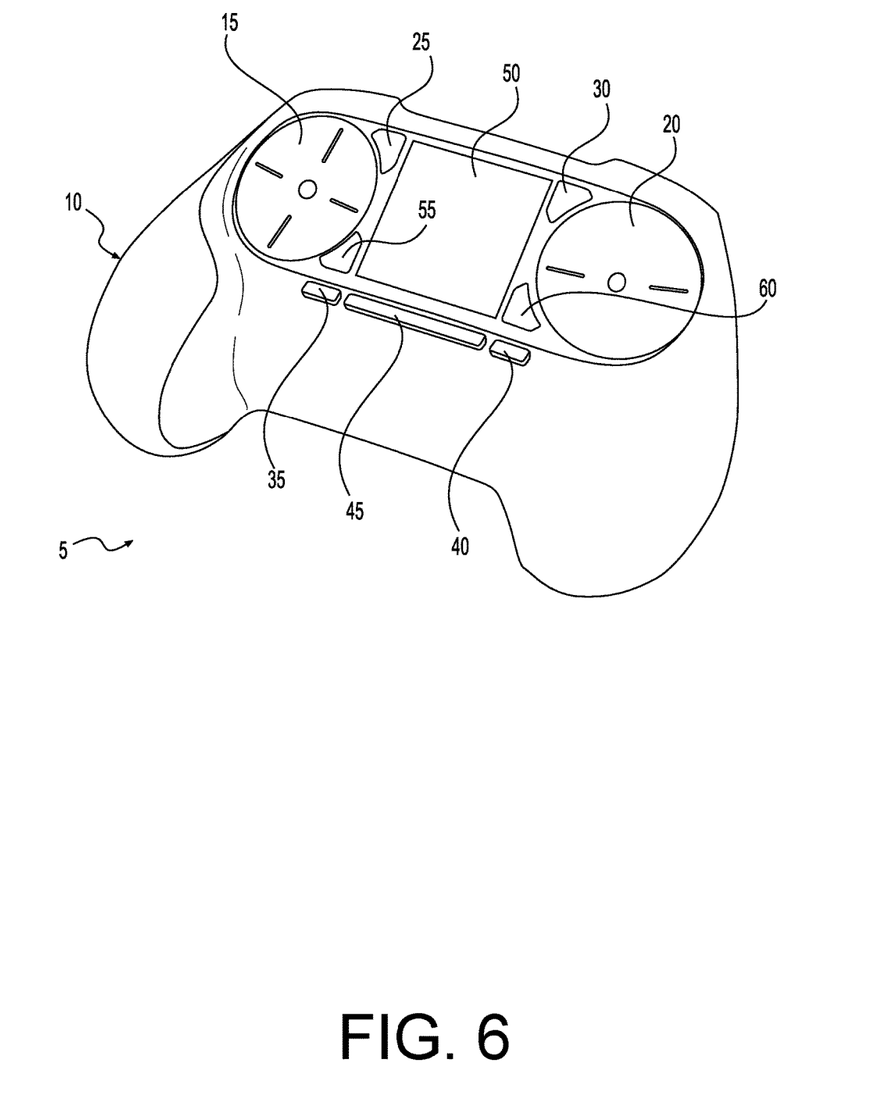
FIG. 6 depicts a frontal perspective view of a game controller according to some aspects of the present invention.

FIG. 6 depicts a frontal perspective view of a game controller 5 according to some aspects of the present invention. FIG. 6 depicts the same configuration and component arrangement as FIG. 1, but from a different angle.

Figure 7:
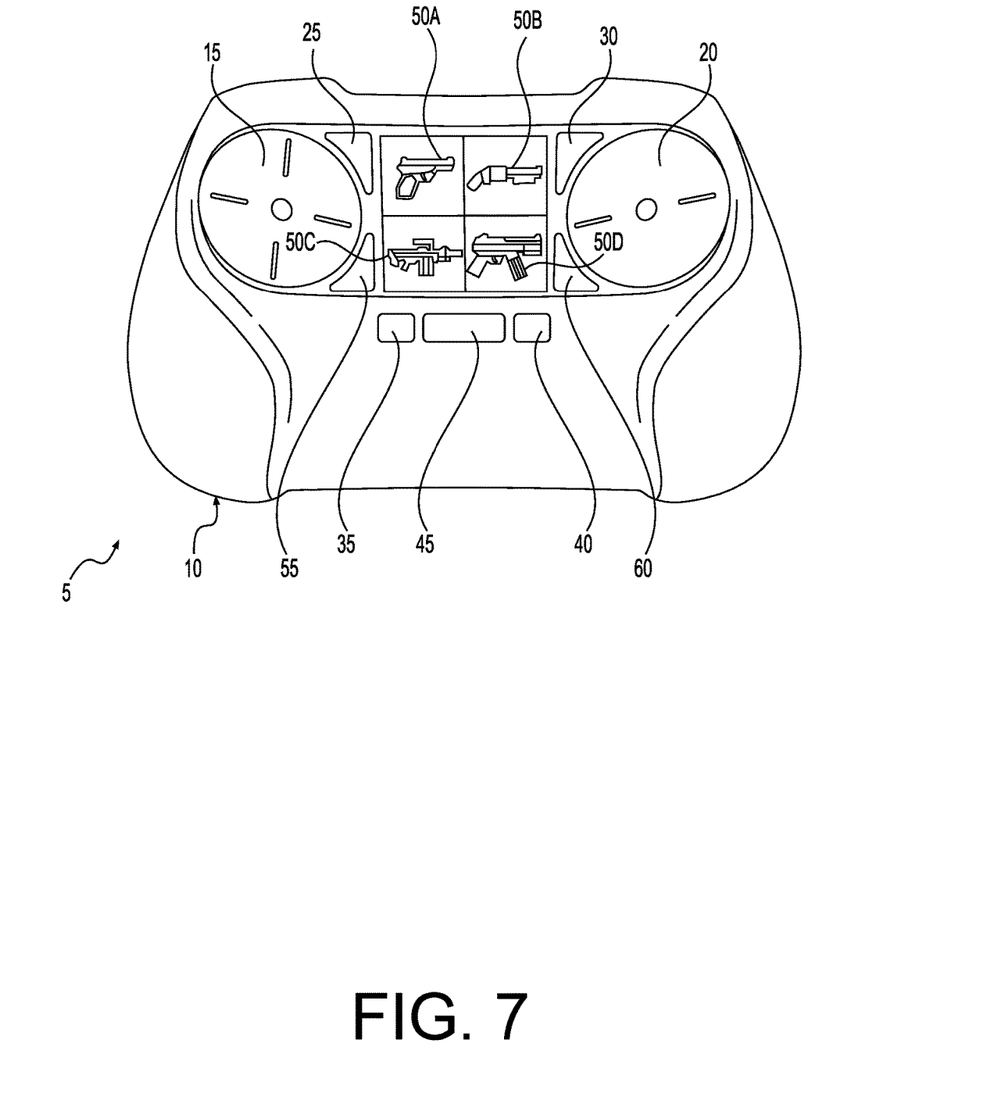
FIG. 7 depicts a front view of a game controller according to some aspects of the present invention.

FIG. 7 depicts a front view of a game controller according to some aspects of the present invention. In exemplary FIG. 7, display screen 50 (referring to FIG. 1) is implemented as four sub-zones (50A, 50B, 50C, 50D), which may comprise separate buttons or other controllers, or may alternatively be implemented as different controllable areas within a touch-screen-type display. In the example shown in FIG. 7, the separate sub-zones (50A, 50B, 50C, 50D) may each represent a different weapon or tool that may be available for user selection while playing a computer game.

Figure 8:
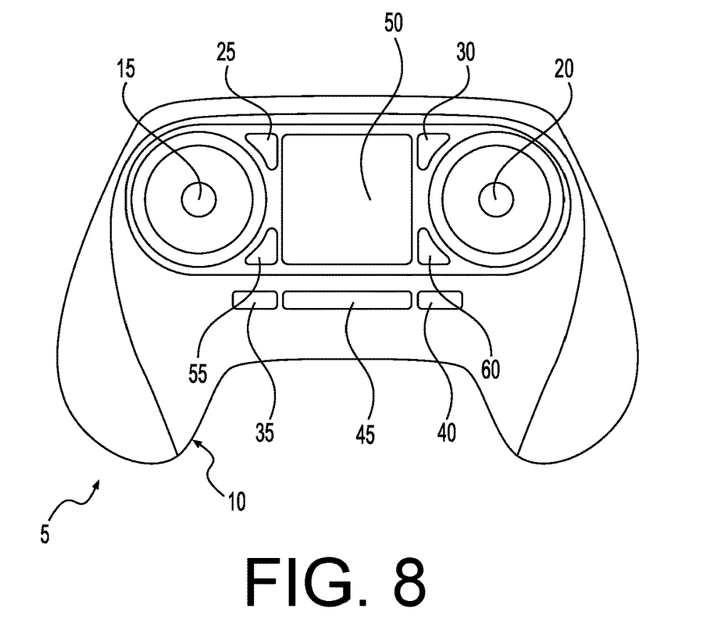
FIG. 8 depicts a front view of a game controller according to some aspects of the present invention.

FIG. 8 depicts a front view of a game controller according to some aspects of the present invention.

Figure 9:
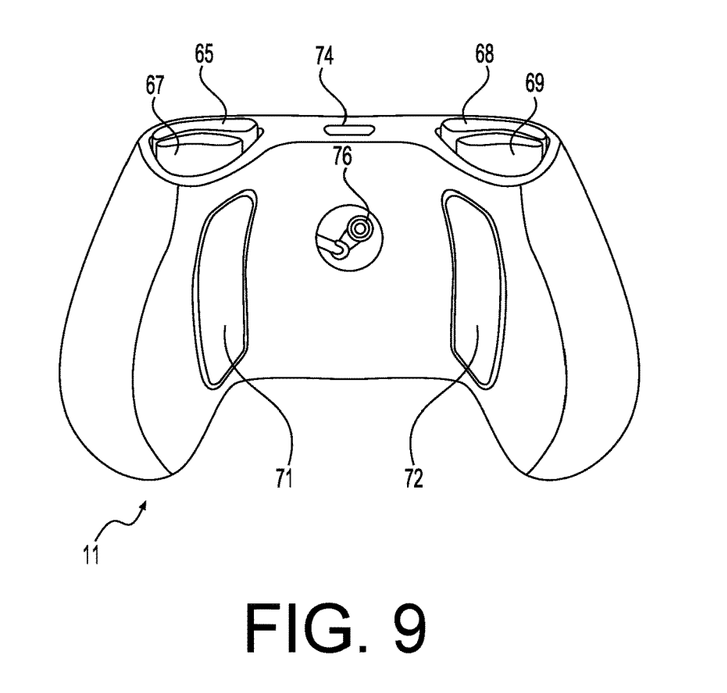
FIG. 9 depicts a rear view of a game controller according to some aspects of the present invention.

FIG. 9 depicts a rear view of a game controller according to some aspects of the present invention. FIGS. 8 and 9 depict the same configuration and component arrangements as in FIGS. 1 and 4, respectively. In addition, FIG. 9 depicts an interface port/connector (e.g., a USB port) along the top of the housing (10/11), as well an identifying logo (76) along the back surface, which may comprise a button or other controller, or an access port for opening the housing (10/11).

Figure 10:
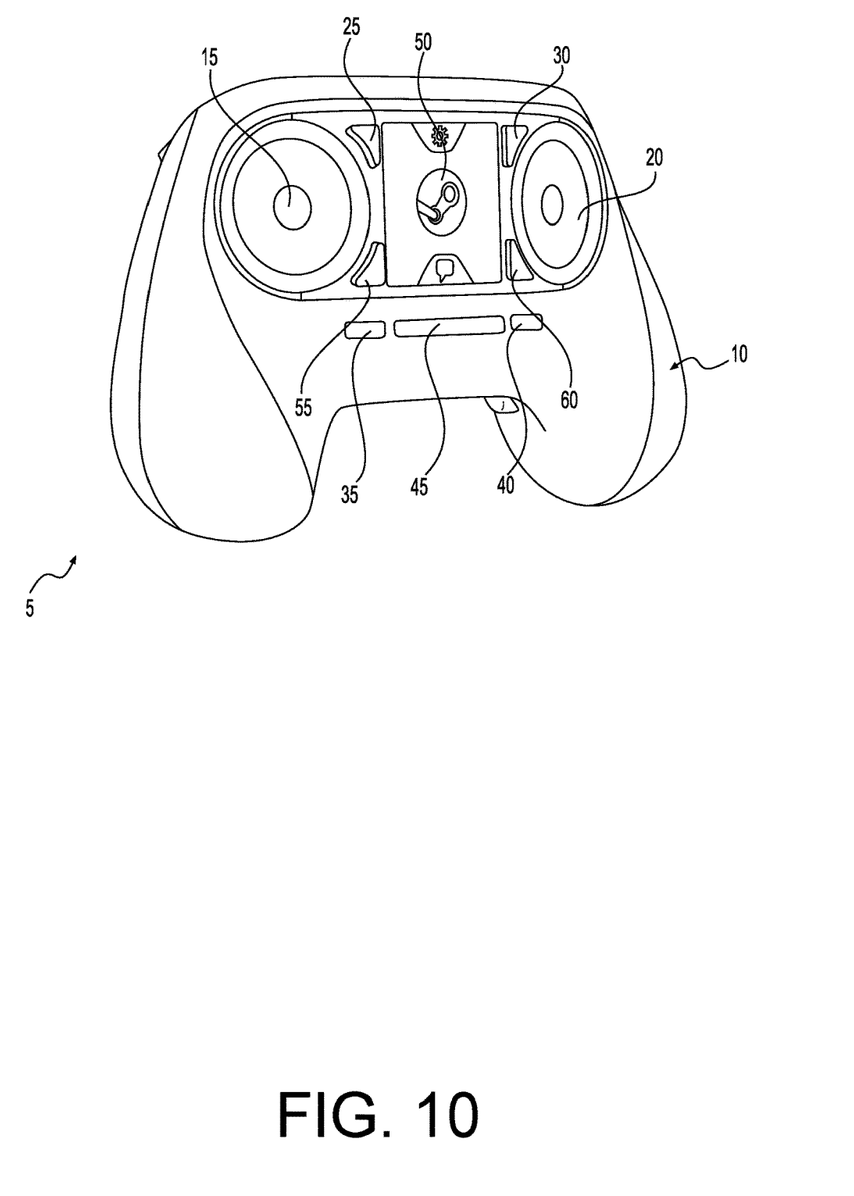
FIG. 10 depicts a frontal perspective view of a game controller according to some aspects of the present invention.

FIG. 10 depicts a frontal perspective view of a game controller according to some aspects of the present invention. FIG. 10 depicts the same configuration and component arrangement as FIG. 1, but from a different angle.

Figure 11:
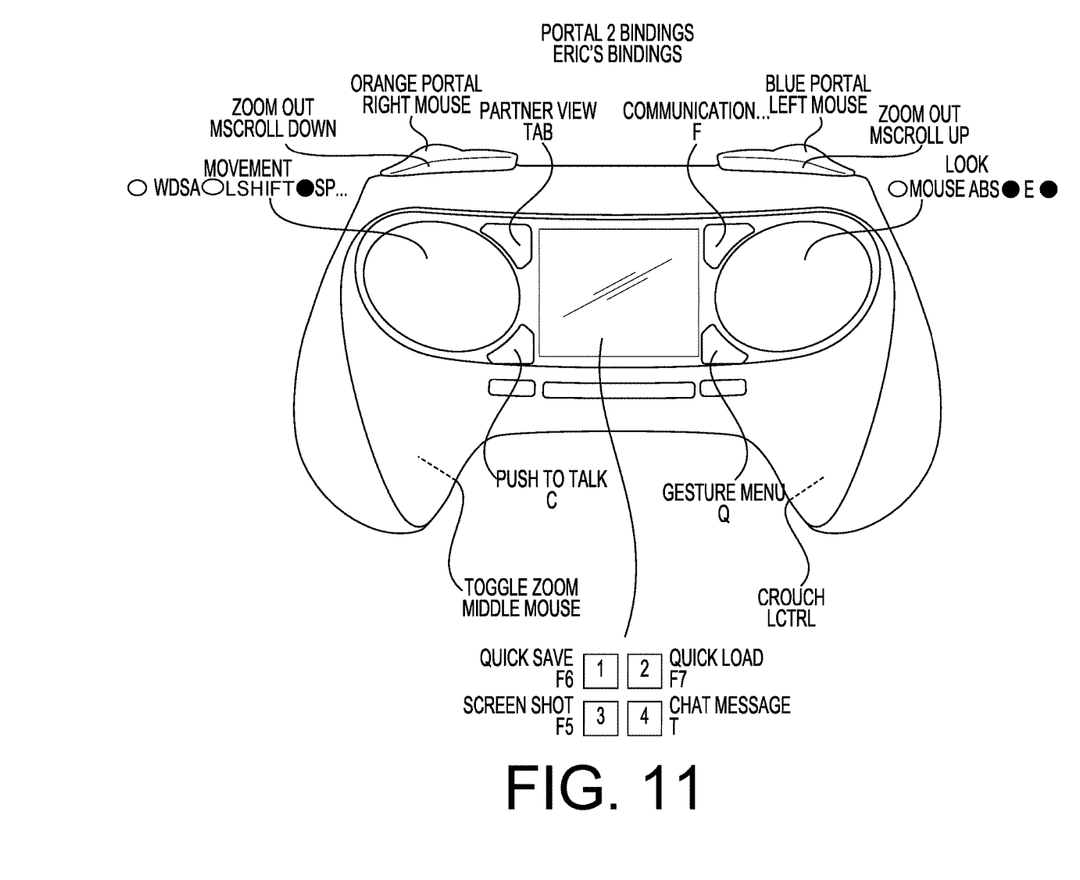
FIG. 11 depicts exemplary button and other controller actuator bindings and mappings using a game controller according to some aspects of the present invention.

FIG. 11 depicts exemplary button and other controller actuator bindings and mappings using a game controller according to some aspects of the present invention.

Figure 12:
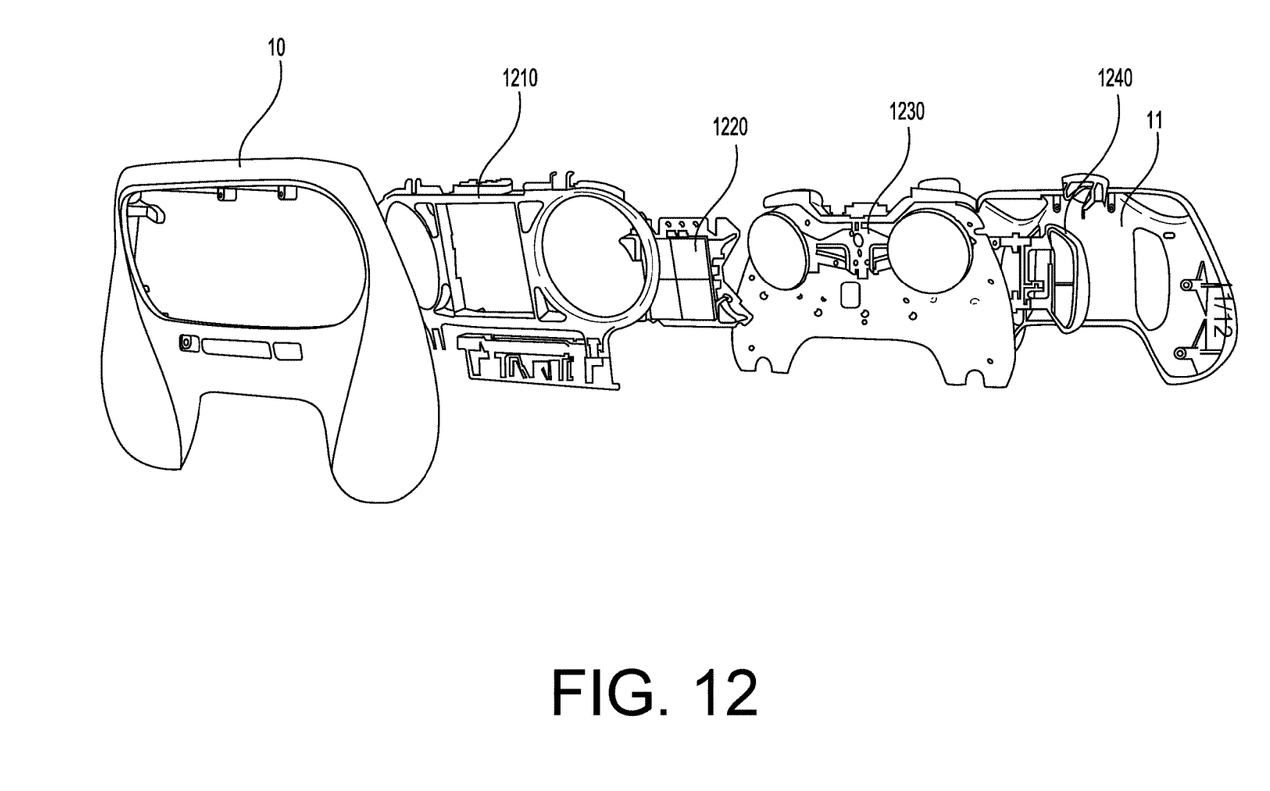
FIG. 12 depicts an exploded view of components comprising a game controller assembly according to some aspects of the present invention.

FIG. 12 depicts an exploded view of components comprising a game controller assembly according to some aspects of the present invention. In the exemplary configuration shown in FIG. 12, multiple components are arranged between front housing 10 and rear housing 11, such as trackpad/display/button template/membrane 1210, central button (and/or display) array module 1220, trackpad/haptics (and top buttons) module 1230, and rear button module 1240.

Figure 13:
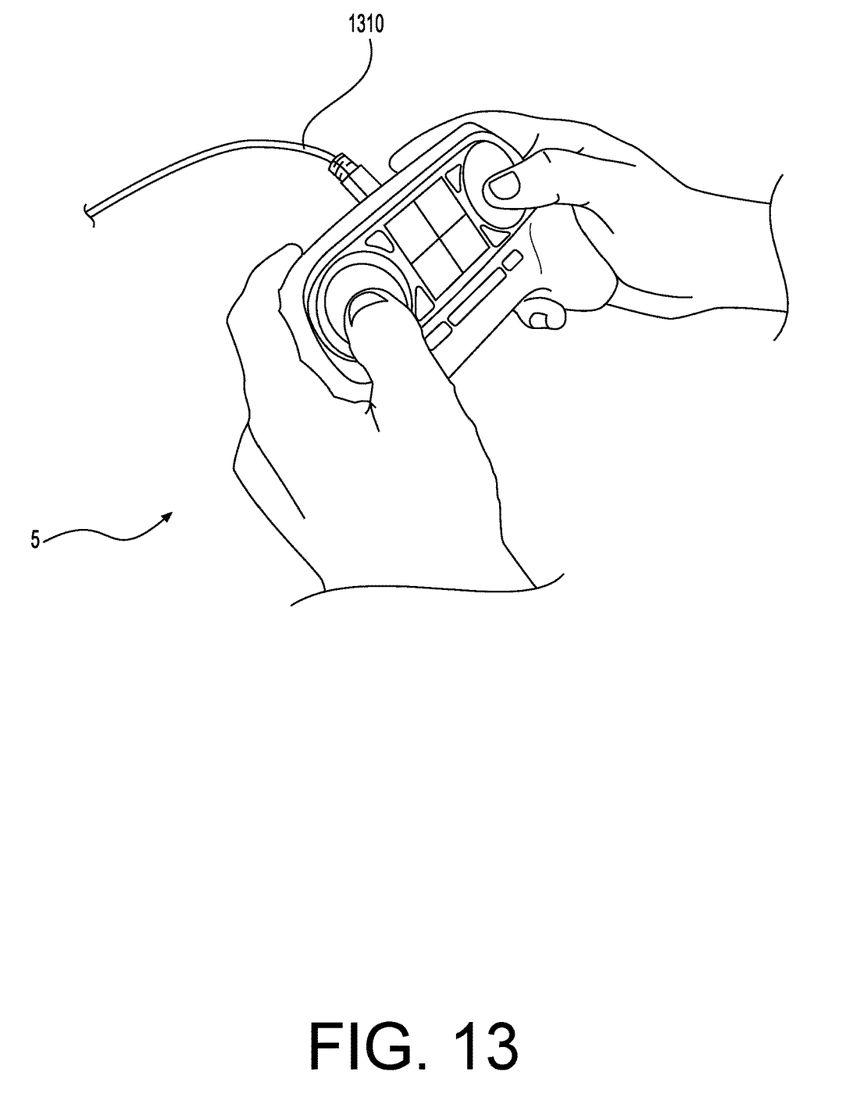
FIG. 13 depicts an exemplary game controller in use by a human according to some aspects of the present invention.

FIG. 13 depicts an exemplary game controller in use by a human according to some aspects of the present invention. Interface cable 1310 connects controller 5 to a computer, game console, or other appropriate device. Other embodiments use wireless connection technology between controller 5 and the connected device.

Game controllers according to aspects of the present invention combine the functionality of three standard Universal Serial Bus (USB) Human Interface Devices (HID): the mouse, the keyboard, and the game controller. The device may be configured through software such that the various inputs (i.e., buttons, joysticks) on the physical controller may be mapped to each of these HID devices simultaneously. For example, a user may configure a controller according to aspects of the present invention such that pressing its right trigger appears to the host computer as though a left mouse-click has occurred and moving its joystick north appears to the host computer as though the 'W' key on a keyboard has been pressed.

To achieve this goal, controllers according to aspects of the present invention report as a USB keyboard, mouse and gamepad. The controller may be dynamically re-configured each time a game is started with a custom built profile for that game. For example, in one game the triggers may be bound to left and right click, while in another game they could be pressing the Enter and Alt keys.

Certain controllers according to aspects of the present invention comprise two circular trackpads (e.g., trackpads 15 and 20 as shown in FIG. 1 and other figures). Driven by the player's thumbs, each one has a high-resolution trackpad as its base. It is also clickable, allowing the entire surface to act as a button. In certain embodiments, the trackpads allow higher fidelity input than has previously been possible with traditional handheld controllers, in certain embodiments approaching or surpassing that of a desktop mouse.

Trackpads, by their nature, are typically less physical than thumbsticks. By themselves, they are typically "light touch" devices and do not offer the kind of visceral feedback that players get from pushing joysticks around. Adding more physicality to the experience is thus desirable in certain implementations. Moreover, "rumble", as it has been traditionally implemented (a lopsided weight spun around a single axis), may not provide sufficient physicality in certain implementations.

Thus, certain controllers according to aspects of the present invention implement haptic feedback based on dual linear resonant actuators to provide relatively higher precision than in certain prior art implementations. These small, strong, weighted electro-magnets are attached to each of the dual trackpads. They are capable of delivering a wide range of force and vibration, allowing precise control over frequency, amplitude, and direction of movement.

This haptic capability provides a vital channel of information to the player in certain embodiments, delivering in-game information about speed, boundaries, thresholds, textures, action confirmations, or any other events about which game designers want players to be aware. The haptics-related components in certain implementations may also play audio waveforms and function as speakers.

In the center of the controller according to certain embodiments is another touch-enabled surface (e.g., item 50 as shown in FIG. 1 and other figures), this one backed by a high-resolution screen. The screen allows a virtually infinite number of discrete actions to be made available to the player, without requiring an infinite number of physical buttons.

In certain embodiments this entire screen (50) itself is also clickable, like a large single button. Thus, in these embodiments actions are not invoked by a simple touch, they instead require a click. This allows a player to touch the screen, browse available actions, and only then commit to the one they want. Players (i.e., users) may swipe through pages of actions in games where appropriate. When programmed by game developers using an appropriate application programming interface ("API") for each particular implementation, the touch screen may work as a scrolling menu, a radial dial, provide secondary info like a map or use other custom input modes.

In order to avoid forcing players to divide their attention between screens, in certain embodiments when a player touches the controller screen, its display is overlaid on top of the game they're playing, allowing the player to leave their attention on the game action.

In certain embodiments, buttons and input zone are placed on the game controller based on frequency of use, precision required and ergonomic comfort. In certain embodiments there are a total of sixteen buttons. Half of them are accessible to the player without requiring thumbs to be lifted from the trackpads, including two on the back. In some embodiments all controls and buttons are placed symmetrically, making left or right handedness switchable via a software configuration checkbox.

Certain embodiments implement a legacy mode that allows the controller to present itself as a keyboard and mouse. User communities may use configuration tools to create and share bindings for their favorite games. Players may choose from a list of the most popular configurations.

In legacy mode, typically no work is done within the game itself to support the game and the controller presents itself as a keyboard and mouse to the system. This allows games that were originally built to function only with a mouse and keyboard to function well with a game controller and therefore in the living room with televisions, for example. Traditionally, games have to be authored or altered to accomplish this, explicitly adding support for a new kind of input device, but game controllers and related systems according to embodiments of the present invention allow this to occur without requiring any changes to the games.

In one exemplary implementation, the left pad sends "WADS" events and the right pad controls the mouse. Either trackpad is capable of virtualization an analog stick, trackball and mouse, and any combination of the three at any time.

In certain embodiments there is momentum on the view when quick swipes are applied on the trackpads. For example, when a user's thumb is near the center of the pad, rotation is a direct input resulting in a 1:1 motion where the camera's rotation is tightly coupled to the two-dimensional panning of the user's thumb. But when the user's thumb reaches the outer ring of the pad, continuous rotation is then exhibited, similar to the input that occurs when a traditional analog stick reaches the outer limit of its enclosure. This is helpful for many typical gameplay motions, such as smoothly circle-strafing or tracking an object in space. Using the virtualized trackball and software-driven virtual momentum, a user may also perform a single flick motion which will result in their point of view quickly rotating a full 180 degrees.

In certain embodiments there are eight discrete buttons available to the user while the user keeps his or her thumbs on the trackpads. Face buttons like the "ABXY" buttons used in some prior art implementations are now reserved for infrequent or tertiary tasks like taunting or communication.

In certain embodiments, the two trackpads on controllers according to aspects of the present invention are fully configurable, and the two trackpads may be configured independently. For example, depending on the requirements of each particular implementation or game environment, the right trackpad may be configured to perform a 1:1 view control mode, while at the same time the left trackpad may be configured as a "D pad," which is divided up into pie-shaped segments, where up-and-down correspond to traditionally used "W" and "S" keys, and left-and-right correspond to the "A" and "D" keys.

In certain embodiments, two trackpads may be configured to both utilize mouse mode. This effectively doubles the trackpad real-estate available to the user, allowing input to occur across a large virtual space while maintaining a high degree of precision. Many gameplay scenarios exist in PC games, for example, which require large mouse movements along with precise targeting. Examples of such scenarios are present in games which utilize cursor-driven drag-and-drop functionality, selection and multi-selection of units in strategy games. There are many other such examples in PC gaming, as well as in other gaming systems and environments. Playing these games with controllers according to aspects of the present invention configured in this dual-mouse mode allows users to move the cursor in required ways while keeping overall cursor travel time down.

In such embodiments in which both trackpads are configured as mouse pointers, they may be used to control the mouse alternately. The two mouse movements get blended together, so user may move first with the left thumb and then with the right thumb, for example, which allows the user to perform a very quick walk across the display screen. This provides a comfortable way for a user to control games that need to move the mouse very precisely, and/or over large distances.

In other embodiments, the left trackpad may be configured to control the camera using the arrow keys, and the right trackpad may be configured as a 1:1 mouse pointer. In this example, the bottom buttons may be configured to zoom in and zoom out. Along with the left trackpad arrow keys, this configuration facilitates a very fluid way to zoom around a map, and to zoom in and inspect a user's assets, such as in certain strategy games (e.g., Civilization 5 from Firaxis Games).

In other embodiments, the game controller trackpads and buttons may be configured to facilitate playing first-person shooter games without having to enable any automatic aiming features.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or sub-combination of the elements from the different species and/or embodiments disclosed herein.

I claim:

1. A game controller comprising:
   a left circular trackpad, located on a left side of a front portion of said game controller so as to be controlled by the left thumb of a user, wherein said left circular trackpad is configured as a mouse pointer and attached to a first haptic actuator;
   a right circular trackpad, located on a right side of said front portion of said game controller so as to be controlled by the right thumb of said user, wherein said right circular trackpad is configured as a mouse pointer and attached to a second haptic actuator;
   a first rear button, located on a rear portion of said game controller so as to be controlled by a subset of the left-hand fingers of said user without requiring said left thumb of said user to be lifted from said left circular trackpad; and
   a second rear button, located on said rear portion of said game controller so as to be controlled by a subset of the right-hand fingers of said user without requiring said right thumb of said user to be lifted from said right circular trackpad.

2. The game controller of claim 1, wherein said left circular trackpad is clickable, so as to enable said left circular trackpad to act as a button.

3. The game controller of claim 1, wherein said right circular trackpad is clickable, so as to enable said right circular trackpad to act as a button.

4. The game controller of claim 2, wherein said right circular trackpad is clickable, so as to enable said right circular trackpad to act as a button.

5. The game controller of claim 1, wherein one or more of said haptic actuators are configured as speakers to play back audio waveforms.

6. The game controller of claim 1, wherein said left circular trackpad and said right circular trackpad are independently configurable to one of a plurality of control modes.

7. The game controller of claim 6, wherein one of said plurality of control modes is a 1:1 view control mode.

8. The game controller of claim 6, wherein one of said plurality of control modes is a mouse mode.

9. The game controller of claim 6, wherein one of said plurality of control modes is a D pad mode.

10. The game controller of claim 1, wherein said game controller comprises a non-console video game controller.

11. The game controller of claim 1, wherein said first and second rear buttons are integrally formed.

12. A game controller comprising:
a left circular trackpad, located on a left side of a front portion of said game controller so as to be controlled by the left thumb of a user, wherein said left circular trackpad is configured as a camera controller and attached to a first haptic actuator;
a right circular trackpad, located on a right side of said front portion of said game controller so as to be controlled by the right thumb of said user, wherein said right circular trackpad is configured as a mouse pointer and attached to a second haptic actuator;
a first rear button, located on a rear portion of said game controller so as to be controlled by a subset of the left-hand fingers of said user without requiring said left thumb of said user to be lifted from said left circular trackpad; and
a second rear button, located on said rear portion of said game controller so as to be controlled by a subset of the right-hand fingers of said user without requiring said right thumb of said user to be lifted from said right circular trackpad.

13. The game controller of claim 12, wherein said left circular trackpad is clickable, so as to enable said left circular trackpad to act as a button.

14. The game controller of claim 12, wherein said right circular trackpad is clickable, so as to enable said right circular trackpad to act as a button.

15. The game controller of claim 13, wherein said right circular trackpad is clickable, so as to enable said right circular trackpad to act as a button.

16. The game controller of claim 12, where one of said rear buttons is configured as a zoom-in controller and the other one of said rear buttons is configured as a zoom-out controller.

17. The game controller of claim 12, wherein one or more of said haptic actuators are configured as speakers to play back audio waveforms.

18. The game controller of claim 12, wherein said left circular trackpad and said right circular trackpad are independently configurable to one of a plurality of control modes.

19. The game controller of claim 18, wherein one of said plurality of control modes is a 1:1 view control mode.

20. The game controller of claim 18, wherein one of said plurality of control modes is a mouse mode.

21. The game controller of claim 18, wherein one of said plurality of control modes is a D pad mode.

22. The game controller of claim 12, wherein said game controller comprises a non-console video game controller.

23. The game controller of claim 12, wherein said first and second rear buttons are integrally formed.

* * * * *